Feb. 16, 1965  YOSHIYUKI INO  3,170,025
OPTICAL SYSTEM FOR PANORAMIC PHOTOGRAPHING
Filed June 7, 1961  4 Sheets-Sheet 1
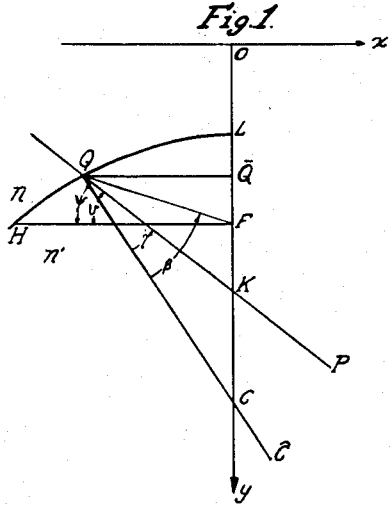
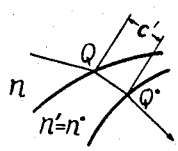
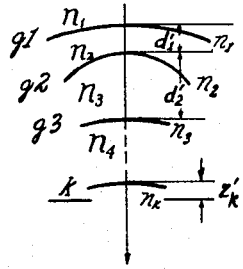
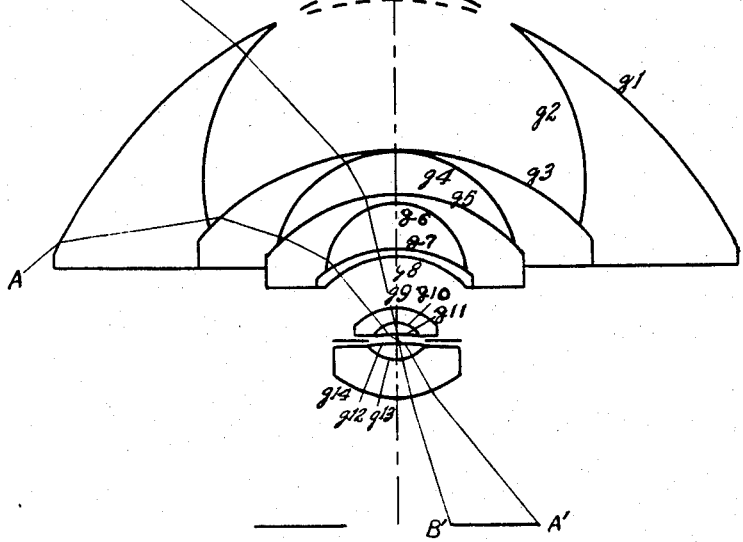
INVENTOR
Yoshiyuki Ino
By Linton and Linton
ATTORNEYS

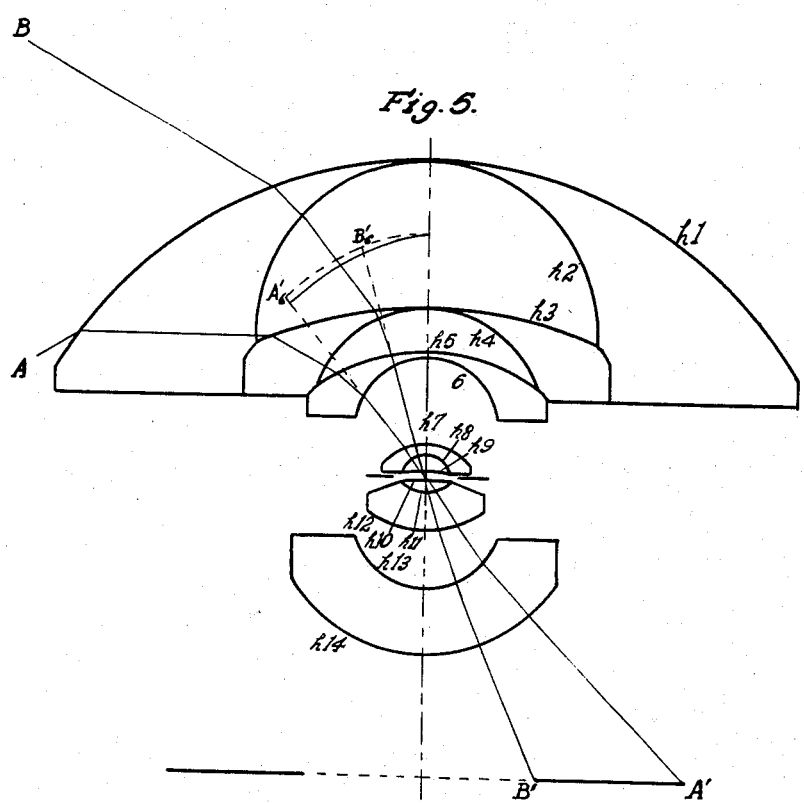

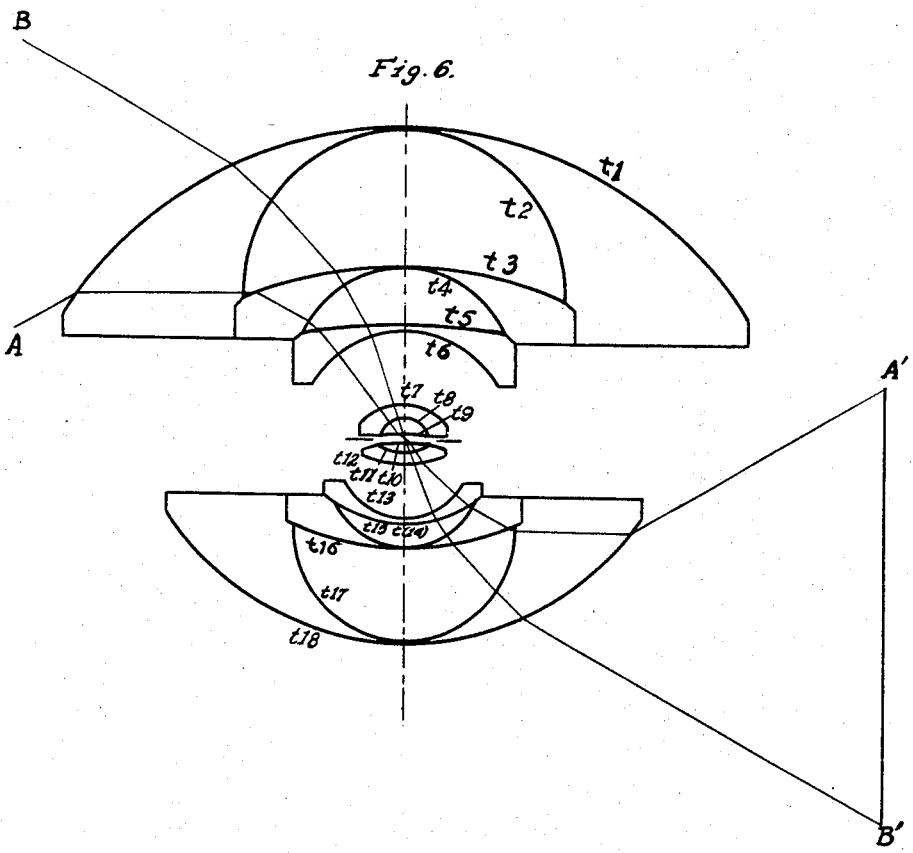

United States Patent Office

3,170,025
Patented Feb. 16, 1965

3,170,025
OPTICAL SYSTEM FOR PANORAMIC PHOTOGRAPHING
Yoshiyuki Ino, 70 Ozu-machi, Kochi-shi, Japan
Filed June 7, 1961, Ser. No. 130,702
4 Claims. (Cl. 88—57)

This invention relates to an optical system of lenses covering the panoramic field of view which can be photographed by using a panoramic camera with rotation mechanism, and a so-called wide-angle or standard objective lens attached, simply and optically, without mechanism, gives a ringed image on a plane or a zonal image on a cylindrical surface, and the image equal to what is given by an ordinary objective such that all the aberrations are sufficiently eliminated except the natural distortion in the ringed image case.

The system is theoretically analyzed into the two systems, the divergent system called the deviation part, and the convergent system called the imagery part, and although either of them independently has considerable aberrations, there are uniform methods of distributing aberrations so as to eliminate them; and the theory of this method includes the case of the reflecting mirror, supported by re-investigating the method of geometrical optics; besides, applying optical properties of a conicoid of revolution can make great contributions to improving aberrations.

An object of my invention is to provide a composite lens system which will give panoramic coverage with substantially no aberration.

Another object of my invention is to provide a composite lens system having a deviation part and a convergent imagery part which are so designed that their respective aberrations substantially annul each other.

The present invention will be further described with reference to the accompanying drawings in which all the figures illustrate meridional sections of rotationally symmetrical optical system and where:

FIG. 1 shows the principles of the invention and illustrates the ray paths for a conicoid of revolution.

FIG. 2 illustrates the path of an oblique ray.

FIG. 3 illustrates the general principles of the optical system of which detailed embodiments are shown in FIGS. 4–7.

FIG. 4 is a system designed to have ellipsoidal and hyperboloidal surfaces for a total deviation of 90°.

FIG. 5 is a panoramic system for the limiting depression ray of −30° obtained by spherical surfaces.

FIG. 6 is an panoramic system using only spheres, and is of the zonal image type.

Figure 7:
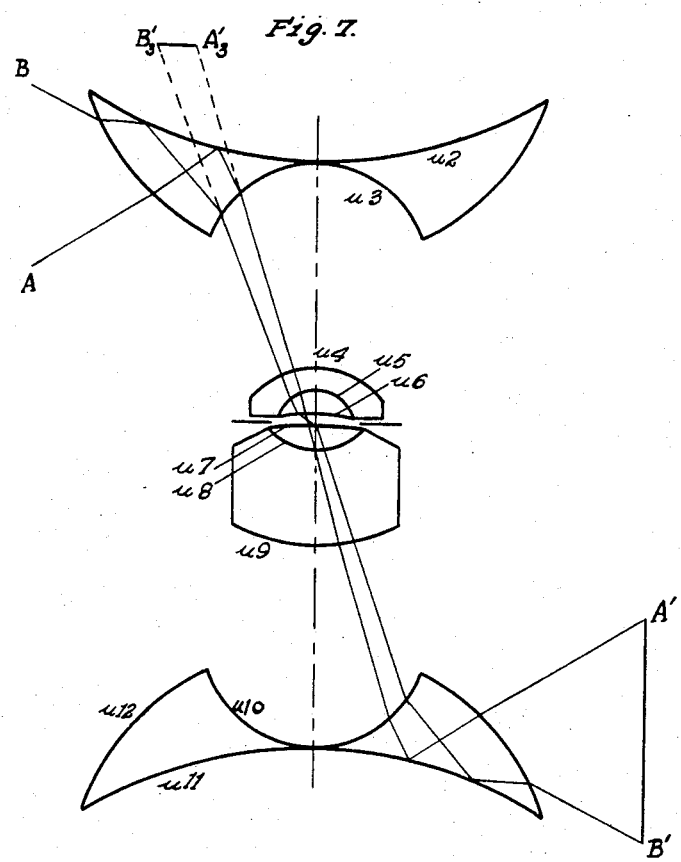
FIG. 7 is a panoramic system in which a catadioptric system is used in the deviation part.

We can define a field of view generally by the extent of an azimuth and an altitude angle. When an azimuth extends over the whole angle of 360° and an altitude ($v$) from a depression ($v<0$) to an elevation ($v>0$) including the horizon ($v=0$), this field can be called a panoramic field or simply a panorama. Also, it is astronomically considered as a part of the celestial sphere or a spherozonal field. Moreover, it is photographically classified into a wide, standard or narrow panorama, the first being defined as the horizontally rotated product of the field which is caught by the wide-angle objective lens, etc. Especially a narrow panorama being interpreted whose elevation and depression are both under 20°, we consider a standard and wide panorama which exceeds a narrow one. This is related to practical values and optical aberration problems, because the increase of the angle is realized only when the problems are statisfactorily solved. At first, we consider a pin-hole camera, as the simplest case whose aberration is negligible, which is enough to do considerable wide-angle photographing, disregarding brightness, because this can be so treated that every object point emits a ray. But it cannot cover any panorama yet. Now, if we put several strong menisci concave lenses one upon the other whose convex sides face the zenith before a pin-hole stop, we can cover any panorama and obtain a ringed image on a plane; and also by adding the same optical system symmetrically after the stop, we can obtain a zonal image on a cylindrical surface. Then, putting a suitable color filter by the stop, the images, of course, will be monochromatic, free from chromatic aberration, centrally symmetrical and satisfactory.

But the latter (zonal) case demands no filter because the color dispersions are eliminated before and after the stop by reversely symmetrical refractions. The deviation system will now be considered. To avoid the filter, in the former (ringed) case, we may use kinds of glass of lower dispersion or of greater Abbé number $v$; moreover, the combination of separately achromatic menisci, determining the refracted angle and the deviation for the only path of the standard ($\alpha$) ray and cemented boundary surfaces, which is simple. In this, the system on one side of the stop, in mass, is called a deviation system, having the action of sending the back rays into the stop, in which it is enough to consider only deviation-action of prisms except imagery-action of lenses, notwithstanding their virtual image formed, because a photograph is taken at a free position of a film for a pin-hole, which state is called unfixed of position.

Moreover, chromatic aberration is greatest for the back ray having the greatest depression, which is called a limit depression ray, and how to control it is the first problem to be solved. The next step is putting a convex lens which has suitable power at the stop position, others being unchanged, so a real image is formed. Then the state changes from unfixed to fixed and the contrast becomes better, since the rays concentrate. But at the neighborhood of the limit, depression ray, we see image curvature and contrast decrease. The standard of flattening curvature is to be taken in the focus position of a zenith ray which has no aberration.

Now, put a prism, in which the fundamental of chromatic aberration consists, of a vertex angle 60°, for instance, on a book, and look at it from below. Then we see that the nearer the letters, the less the aberration, although the prism always accepts equal deviation and dispersion. Because a nearer object has a nearer virtual image whose neighborhood can be regarded as an almost point-source from which refracted rays emerge, no matter how much dispersion they may accept; while rays for such an infinitely distant object as a star accept dispersion itself and have maximum aberration.

Next, take a meniscus concave lens and give it a limiting depression ray, making the deviation 30°, for instance, then we can make tangent planes at two points on the lens which are penetrated by the ray, and a prism determined by these planes. Substituting the prism for the lens, we see that the lens has far less aberration than the prism, although both optical paths are the same, for the virtual image formed by the lens is near, whose principle is the same as the above. Omitting the separate achromaticity of the deviation system, we can eliminate the aberration by the power of the convex lens, which will be generally called an imagery system. Regarded as parts of the whole system, the terms deviation and imagery part are used.

After all, it is sufficient that the deviation part be so made as to reach the value of reducing the burden of the imagery part, only using kinds of glass of greater Abbé number $v$. The separate achromaticity determines the thickness of the bottom of the deviation part, and in the case of complex design, the inner lenses become very small and the whole system very dark. Hence, the principle is important for designing. The deviation part is enough to make the limiting depression ray of −30°, e.g., the elevation ray of about 50°, whose total deviation is about 80°. It is better to make the deviation less than 30°. For, if we go as far as the critical angle, the deviation can be even 50°, but rays become of grazing incidence, and neighboring rays cannot be admitted, and other aberrations increase.

Since it is better to make the interior deviation smaller, let the deviation part of the system consist of three elements whose deviations for the limiting depression ray are 30°, 30°, 20° respectively in order, from the outside. By selecting the kind of glass of the first element, we can determine the angle of incidence, the normal and the first surface which may be a sphere, e.g. by drawing, one after another. Then, make the second the sphere whose radius coincides with the refracted ray and is determined by the vertex thickness, its deviation becomes zero and the first lens element is produced, in which two deviations may be distributed. If the zenith ray is of no use, the vertex thickness may be zero or negative, in which the vertex is bored and stopped, and an onion-shaped lens element is produced; and the tracing of the zenith ray has no physical meaning, but can be algebraically performed; therefore, it is called the pseudo-zenith ray and used as the standard of the image surface.

As achromaticity, at least, is needed even in the case of the pin-hole, so is the imagery part, and distribution of aberrational burdens of all elements of the part, thereby the panoramic system is determined. Even the panorama whose limiting depression ray is −70° can be caught by the pin-hole. Generally, the virtual image curvature after the deviation part is bent towards the stop side, which is also seen by the Petzval quantity (or curvature) being negative. Adding the imagery part whose Petzval quantity is positive, the last curvature is ordinarily positive by over elimination or higher-order aberration, and the image surface is again apt to be bent towards the stop side. The above was the ringed case.

Next in the zonal case, the system before and after the stop are called the first and the second deviation system respectively. When the zenith ray is sent into this system, if the last focus were a finitely distant point on the axis, the last image surface would have to pass through this point and to curve, and could not become a truly cylindrical surface. Therefore, the last focus is infinitely distant, or the system must be afocal or telescopic along the axis.

Next, let the image curvature immediately before and after the imagery part of the system be mutually and completely symmetrical as to the stop or of equal and opposite sign. If the latter image were before the second deviation part, it would be a virtual image which cannot go out, or would conflict with the principle of the zenith ray being afocal; therefore, the image is within the second deviation part. But owing to the assumption of symmetry, again all the last images must recede infinitely far away, which is unreasonable. Therefore, the latter (real) image must be more strongly curved than the former (virtual), over a symmetrical degree. These are summarily called the principle of the image curvature.

The deviation part of the system can be a convex mirror, whose back faces the zenith side. Since it freely admits any depression ray, we call to account no limiting depression ray, but the limiting elevation ray, under a similar meaning. It is noted that the freely admittable elevation ray which does not strike the mirror is of no use. Generally, using two or more mirorrs leads to covering the optical path. Then, in order to admit many elevation rays, there is nothing for it but to arrange inversely the above-mentioned deviation system of lenses immediately before the mirror. If the second surface of the inverted deviation system of a lens is polished up to a mirror surface, and the third refracting surface of it is made as the exit of the deflected rays in the glass, then a mixed system of refraction and reflection of a catadioptric system is produced as a deviation system. If the considerable deviation of the limit elevation ray is given by the first and third surface, the angle of incidence at the second mirror surface can be made smaller, and many elevation rays can be admitted.

Since all the preceding units relate to the case of the pin-hole, the monochromatic aberrations produced only decrease of contrast, but as the stop is gradually opened, the image becomes out of focus. Generally, designing of an optical system is founded on such analytical theory as the Seidel terms and is performed by tracing of paraxial and oblique rays. This tracing consists of that of an optical path and image positions. It is desirable to fundamentally re-investigate a part of the usual theory of geometrical optics and, for example, to consider formulae of paraxial images. This is reduced to the refraction formula $n'_j/s'_j - m_j/s_j = (n'_j - n_j)r_j$ and the shifting formula $s_{+1} = s'_j - d_j$; where $j$'s, $n$'s, $r$, $s$'s and $d$'s, denote respectively $(j)$ numbers, $(n)$ refractive indexes, $(r)$ a radius of curvature, $(s)$ image positions, and $(d')$ a thickness.

A quantity with a prime (') denotes the resultant after refracting. Omitting numbers, now, if we use such an operator $\Delta$ as $n' - n = \Delta n$ and a $(\cdot)$ for a quantity after shifting, the formulae become simply: $\Delta(n/s) = (\Delta n)/r$ and $\dot{s} = s' - d'$. Usually positive directions of the optical axis and rays are from the left to the right, and the following sign conventions are adopted: $s$ and $r$ are positive respectively when an image and a center of curvature are on the right of the vertex, and vice versa, while $n$ and $d'$ are always positive. But, we will add the new conventions: that $n$ and $d'$ are positive respectively when a ray goes to the right and the next surface is on the right side and vice versa.

Then the conventions become completely algebraic, and the above-mentioned formulas hold even when reflecting surfaces are included. Actually, on the Seidel terms of the pure reflecting mirror system, there is Schwarzschild's treatment still used by present workers, in which $d'$ is always positive and rays go to the right by arranging the same mirrors back to back and the terms are calculated and proved independently of the refracting case. But, by the new convention, this independent proof becomes needless, while the idea of "back to back" needlessly complicates the calculation of the catadioptric system and especially of the image curvature. Besides, since the new convention is also applied to oblique ray tracing, and free management is attained for all branches of the theory, then the article of the catadioptric becomes of no use.

Next, as to the Seidel terms, let the image sequences of the object and stop be respectively $\{s\} = s_1, s'_1, \ldots$, $\{z\} = z_1, z'_1, \ldots$, and set
$$h_j = s_a \ldots s_j/(s'_1 \ldots s'_{j-1}), \delta_j =$$
$$\sum_{\mu=2}^{j} d'_{\mu-1}/(n_\mu h_{\mu-1} h_\mu), B = s_1 z'_1/\{n_1(z_1 - s_1)\}, \bar{\delta}_j = \delta_j + B$$

then we have, omitting suffixes
$$\delta = sz\{nh^2(z-s)\} = s'z'/\{n'h^2(z'-s')\}, \dot{h} = \pi s \cdot /s',$$
$$\delta \cdot = \Sigma d'/(n'hh \cdot).$$

If the real stop is $z'_k$ being immediately behind the $k$-th surface, we can determine $\delta_k$, $\beta$ and all $\delta_j$ from the above equations. Now, setting $Q = n(1/r - 1/s)$, $\epsilon = 1/(h^2 Q)$, we have the Seidel terms: $I = h^4 Q^2 \Delta\{1/(ns)\}$, $II = (\epsilon + \delta)I$, $III = (\epsilon + \delta)II$, $IV = -(1/r)\Delta(1/n)$ and $$V = (\epsilon + \delta)(III + IV)$$

which are respectively called spherical aberration, coma, astigmatism, curvature or Petzval quantity, and distortion.

Setting $[S_1]=I$, $[S_2]=(\epsilon+\delta)[S_1]$ etc., $\delta$ for $\bar{\delta}$ in the above, the following are written: $II=B[S_1]+[S_2]$, $III=3B^2[S_1]+6B[S_2]+[S_4]$ etc., where IV, V are more complicated. And $Z_1$ given by B is not the real stop, but the entrance pupil. The stop position is ordinarily shifted after designing in order to eliminate coma etc. But in our case, this shifting is rather inconvenient, for the stop position is closely connected with the deviation system and consequently admits no shifting. And also the path of rays before the stop must be traced in reverse order (to the left), while after the stop in regular order (to the right), for the pin-hole case is standard. Total aberration is denoted such as $(I)=\Sigma I$.

(I) is usually negative and positive respectively for the deviation and the imagery system and as the latter power is stronger, the total remains positive. The total aberration of the deviation system is not adjustable over a wide range, but is almost completely determined by the deviation. As increasing brightness tends to eliminate (I) we make the imagery system of complex construction and give it the required positive (I). Generally, I, III and IV can be called the longitdinal aberrations, while II and V can be called the transverse aberrations, and the latter is to be eliminated, but the former doubled by symmetrical arranging, which is a principle.

For, $\delta$ the Seidel thickness measured from the real stop is positive and negative respectively before and after the stop and similarly $(\epsilon+\delta)$ whose order is odd only in II and V. Also, we can define the longitudinal chromatic $C=h^2Q\Delta(dn/n)$ and the transverse (or magnification) one $D=\delta C$, where $dn=(n-1)/\nu$. Now, we make the imagery system so that the two systems are almost equal and symmetrically set as to the stop, either of them consisting of suitably convergent and divergent lenses, cemented together. Then, by choosing curvatures, we can to a considerable extent eliminate (II) etc. against the deviation system. But, as to the image curvature, such special consideration must be given as in principle is needed, and also likewise as to the astigmatism, especially for a wide panorama. Chromatic aberration is controlled by the kinds of glass of the imagery part. The principle of image curvature here presented has been heretofore described. The astigmatism and the use of conicoids are here presented are hereinafter described.

Next, we point out that a conicoid of revolution contributes to eliminating aberrations. Although a toric surface is supposed to be simple, as it is biquadratic, calculations, especially of principal curvatures, are difficult. A conic as the generating curve, is an ellipse, parabola or hyperbola according to the eccentricity $\epsilon<$, $=$ or, $>1$ and has only one axis including the focus, and this axis used as the axis of revolution of the conicoid.

FIGS. 1 and 2 illustrate the meridional section and trigonometrical tracing to be done, and O is the origin, $P(x_p, y_p)$ denoting coordinates, $Q\overrightarrow{Q}\|HF\|Ox$, $L(o,m)$, $Q(-R,\overline{R})$, $H(-l,g)$, $K(o,a)$, $C(o,M)$, $\overrightarrow{FK}=k$, $\overrightarrow{FQ}=\rho$, $CQ=r$, $\hat{C}Q=\hat{r}$ $\overrightarrow{QP}=s$, where all lengths and angles are positively drawn. The conic is expressed by $$\rho=l/(1+\epsilon \sin \varphi) \quad (1)$$

where $l$ is the latus rectum, $\overrightarrow{QKP}$ is an incident ray, omitting the refracted ray $\overrightarrow{QK'P'}$. If Q lies on the lower right side, $l$ and $\rho$ are considered to be negative, while all angles are measured still on the left side. $r$ and $\hat{r}$ are a length of the normal and a radius of curvature for the curve respectively, but are also a sagittal and meridional radius of curvature for the surface, proved by differential geometry.

Then we have:

$$r \cos \beta = \hat{r} \cos^3 \beta = l \quad (2)$$

$$\Delta(n/s) = \lambda/r = \lambda \cos \beta/l, \quad s \cdot = s' - c' \quad (3)$$
$$\Delta(n \cos^2 i/s) = \lambda/r = \lambda \cos^3 \beta/l, \quad s \cdot = s' - c' \quad (4)$$

where $\lambda = \Delta n \cos i$ and $s$ and $\hat{s}$ denote respectively meridional and sigittal images.

Setting $$A = \Delta\{(1/s - 1/\hat{s}) n \cos^2 i\} \quad (5)$$
$$A = (\lambda/r)\{\sin^2 \beta - \sin^2 i' + (r/s) \sin (i+i') \sin i'\} \quad (6)$$

The system may be turned inside out or rotated by 180° around O, but A is still invariant. Therefore, the astigmatism cannot be eliminated by symmetrical arrangement. If $1/s' - 1/\hat{s}' > 0$ for $s = \hat{s}$, $A > 0$, which case is called positive astigmatism, while A is the astigmatic power in general. If $\beta = i'$ for $s = \hat{s} = \infty$, $A = 0$ which means that if the stop is the focus of the conicoid, the system has no astigmatism for any object at infinity, and $$\sin \beta = (\sin i')\{1 - r \sin (i+i')/(s \sin i')\}^{1/2} \quad (7)$$

then $\beta$ and the surface are determined.

Let $\alpha$ be an auxiliary angle, $\theta$ be a deviation, $L^*(O,m^*)$ be the vertex of the sphere on which Q and C lies, $\overrightarrow{LL} = d'$ and $\overrightarrow{L^*L^*} = d^{*\prime}$, then we could establish a set of formulas, for the determinations and tracing, as follows:

$$\tan \beta = -d\rho/(\rho d\varphi) = \epsilon \cos \varphi/(1+\epsilon \sin \varphi) \quad (8)$$
$$R = r \cos \psi = \rho \cos \varphi = l (\tan \beta)/\epsilon \quad (9)$$
$$\psi = \beta + \varphi = i + v = i' + v' \quad (10)$$
$$1/(\epsilon \cos \varphi) = \cos \beta - \tan \varphi \quad (11)$$
$$\sin \beta = \epsilon \cos \psi \quad (12)$$
$$r = l (\tan \beta)/(\epsilon \cos \psi) \quad (13)$$
$$a' = a \cdot, \quad v' = v \cdot \quad (14)$$
$$k = a - g = \rho \sin (v - \varphi)/\cos v' \quad (15)$$
$$\tan \varphi = l \tan v/(l + \epsilon k) \quad (16)$$
$$k' = a' - g = \rho \sin (v' - \varphi)/\cos v' \quad (15')$$
$$\sin (\varphi - \alpha) = -k \cos \varphi/(l + \epsilon k) \quad (17)$$
$$k' - k \cdot = g \cdot - g = \rho' \quad (18)$$
$$\overrightarrow{FC} = r \sin \beta/\cos \varphi = \rho \sin \beta/\cos \psi = l \tan \beta/\cos \varphi = l\epsilon/(1+\epsilon \sin \varphi) \quad (19)$$
$$\rho = r \cos \psi/\cos \varphi = l \cos \psi (\cos \beta \cos \varphi) \quad (20)$$
$$\overrightarrow{KC} = r \sin i/\cos v \quad (21)$$
$$\overline{R} - \overline{R} \cdot = c' \sin v' \quad (22)$$
$$R - R \cdot = c' \cos i' \quad (23)$$
$$\overrightarrow{QC} = r \sin \psi \quad (24)$$
$$M = \overline{R} + r \sin \psi = g + r \sin \beta/\cos \varphi = a + r \sin i/\cos v \quad (25)$$
$$\overrightarrow{QF} = \rho \sin \varphi \quad (26)$$
$$\overrightarrow{QK} = R \tan v \quad (27)$$
$$a = \overline{R} + R \tan v = g + k \quad (28)$$
$$d' = m \cdot - m \quad (29)$$
$$r = (a - m^*)/(1 - \sin i/\cos v) = (a' - m^*)/(1 - \sin i'/\cos v') \quad (30)$$
$$M = m^* + r \quad (31)$$
$$m^* = m^* \cdot - d^{*\prime} \quad (32)$$
$$R = r \cos \psi \quad (33)$$
$$\overline{R} = M - r \sin \psi \quad (34)$$
$$c' = (R - R \cdot)/\cos v' \quad (35)$$
$$N' \sin i' = N \sin i \quad (36)$$
$$\theta = i - i' \quad (37)$$
$$\tan i = n' \sin \theta/(n' \cos \theta - n) \quad (38)$$
$$\tan i' = n \sin \theta/(n' - n \cos \theta) \quad (39)$$
$$\lambda = \Delta n \cos i = (n' - n) \cos (\theta/2)/\cos \{(i+i')/2\} \quad (40)$$

The surface is given by $(l, e, g)$ or $(l, e, d')$. At the vertex, $\varphi = 90°$, then from Equations 8 and 2 $\beta = 0$ and $r = \hat{r} = l$ or $l$ becomes the radius of curvature. As the eccentricity $e = 0$ for the sphere, alway $\beta = 0$.

These formulas are enough to trace the path for a given special ray, or inversely to determine all elements of surfaces after determining $\beta$ for the given path. And setting $$\overrightarrow{CL} = r(1+n) \quad (41)$$
$$n = (1-\sin\psi)(1-\cos\beta)/(\sin\psi+\cos\beta) \quad (42)$$

As $\beta$ and $\psi$ are positive acute angles, $n>0$. If $\beta<45°<\psi$, $n<1/16$. If $\beta<30°$ and $60°<\psi$, $n<1/100$.

These represent the difference from the sphere, and $$m = m^* - nr \quad (43)$$

If the limiting depression ray of $-40°$ accepts the devation $\theta_1 = 30°$ by the first surface and next no deviation $\theta_2 = 0$, then $v_2 = -10°$, $v_3 = -10°$, and by determining these sagittal radii of curvature $\{r\}$, the saggital image sequence $\{s\}$ is completely determined. If the meridional $\{\hat{s}\}$ coincides with $\{s\}$, no astigmatism can appear, for which we determine $\beta$, $e$ and $l$ by (7), (12) and (2) one after another, and $i$ and $i'$ by (38) and (39), by which all the others are decided.

FIG. 2 represents oblique ray tracing, where $\overrightarrow{QQ\cdot} = c'$ ($c_1', c_2', \ldots$) denotes oblique thickness (or distance-separation). $Q\cdot$ is seen in formulas (22), (23), (35). All the formulas are written by abbreviating numbering (= affix) $j$ using prime (') and dot ($\cdot$). These formulas are intended for the case of the conicoid of revolution. $Q\cdot$ denotes the refracting point after shifting.

FIG. 3 shows how to represent the data of enforced examples for FIGS. 4–7, and the positive sense of the axis is taken downwards. In FIG. 3 and the data tables of the examples, $r$ denotes the radius of curvature at the vertex even for the conicoid, having the meaning of $l, z'_k$ denotes the real stop. Putting the above-mentioned study as the basis, we indicate enforced examples as follows, $n=1$ denoting (the refractive index for) air.

Here again, $r$ is the radius of curvature as $d'$ is the thickness, $v$ is the Abbé number and $e$ is the eccentricity.

*First example (see FIG. 4)*

| No. | r | d' | n' | v | e |
|---|---|---|---|---|---|
| g1 | 1.210 | −0.056 | 1 | | [1] 0.698 |
| g2 | 0.761 | 0.653 | 1.5163 | 64 | |
| g3 | 1.060 | 0 | 1 | | [2] 1.222 |
| g4 | 0.489 | 0.169 | 1.4875 | 70 | |
| g5 | 0.675 | 0.023 | 1 | | |
| g6 | 0.283 | 0.166 | 1.4875 | 70 | |
| g7 | 0.495 | 0.023 | 1 | | |
| g8 | 0.396 | 0.183 | 1.4875 | 70 | |
| g9 | 0.231 | 0.058 | 1 | | |
| g10 | 0.1117 | 0.061 | 1.7174 | 29.6 | |
| g11 | 0.488 | 0.029 | 1.6260 | 39.2 | $z_{11}'=0.022$ |
| g12 | 1.194 | 0.058 | 1 | | |
| g13 | −0.1463 | 0.161 | 1.6260 | 39.2 | |
| g14 | −0.334 | 1.812 | 1.7174 | [2] 1.812 | |
| g15 | | 1 | | | |

[1] Ellipsoid of revolution.
[2] Hyperboloid of revolution.

*Second example (see FIG. 5)*

In the following cases, the kinds of glass are the same as above and distinguished only by $n$, omitting $v$.

| No. | r | d' | n |
|---|---|---|---|
| h1 | 1.730 | 0 | 1 |
| h2 | 0.685 | 0.578 | 1.5163 |
| h3 | 1.716 | 0 | 1 |
| h4 | 0.473 | 0.164 | 1.4875 |
| h5 | 0.745 | 0.021 | 1 |
| h6 | 0.282 | 0.342 | 1.4875 |
| h7 | 0.232 | 0.058 | 1 |
| h8 | 0.1117 | 0.061 | 1.7174 |
| h9 | 0.488 | 0.029 | 1.6260  $z_9'=0.022$ |
| h10 | 1.194 | 0.058 | 1 |
| h11 | −0.1463 | 0.161 | 1.6260 |
| h12 | −0.410 | 0.228 | 1.7174 |
| h13 | −0.307 | 0.250 | 1 |
| h14 | −0.629 | | 1.4875 |
| h15 | | | 1 |

*Third example (see FIG. 6)*

| No. | r | d' | n |
|---|---|---|---|
| t1 | 1.624 | 0 | 1 |
| t2 | 0.643 | 0.537 | 1.5163 |
| t3 | 1.623 | 0 | 1 |
| t4 | 0.445 | 0.224 | 1.4875 |
| t5 | 2.532 | 0.019 | 1 |
| t6 | 0.437 | 0.290 | 1.4875 |
| t7 | 0.232 | 0.058 | 1 |
| t8 | 0.1117 | 0.061 | 1.7174 |
| t9 | 0.488 | 0.029 | 1.6260  $z_9'=0.022$ |
| t10 | 1.194 | 0.380 | 1 |
| t11 | −0.200 | 0.032 | 1.6260 |
| t12 | −0.455 | 0.220 | 1.7174 |
| t13 | −0.272 | 0.014 | 1 |
| t14 | 0.489 | 0.098 | 1.4875 |
| t15 | −0.311 | 9 | 1 |
| t16 | −1.130 | 0.375 | 1.4875 |
| t17 | −0.450 | 9 | 1 |
| t18 | −1.140 | | 1.4875 |
| t19 | | | 1 |

*Fourth example (see FIG. 7)*

| No. | r | d' | n |
|---|---|---|---|
| u1 | −0.485 | −0.198 | −1 |
| u2 | −0.858 | 9 | −1.5163 |
| u3 | 0.225 | 0.403 | 1.5163 |
| u4 | 0.1693 | 0.042 | 1 |
| u5 | 0.0817 | 0.044 | 1.7174 |
| u6 | 0.356 | 0.023 | 1.6260  $z_6'=0.107$ |
| u7 | 0.168 | 0.057 | 1 |
| u8 | −0.128 | 0.183 | 1.6260 |
| u9 | −0.401 | 0.400 | 1.7174 |
| u10 | −0.225 | 0 | 1 |
| u11 | 0.858 | −0.198 | 1.5163 |
| u12 | 0.485 | | −1.5163 |
| u13 | | | −1 |

The elements designated in the immediately preceding First, Second, Third and Fourth, examples, by the reference characters $g$, $h$, $t$, $u$, followed by a numeral, that is, $g1$ to $g15$, $h1$ to $h15$, $t1$ to $t19$, and $u1$ to $u13$, are lens srufaces.

The following lenses are doublets:

Lens ($g9$, $g10$, $g11$,) and lens ($g12$, $g13$, $g14$), in FIG. 4.
Lens ($h7$, $h8$, $h9$), and lens ($h10$, $h11$, $h12$), in FIG. 5.
Lens ($t7$, $t8$, $t9$), and lens ($t10$, $t11$, $t12$), in FIG. 6.
Lens ($u4$, $u5$, $u6$), and lens ($u7$, $u8$, $u9$) in FIG. 7.
The other lenses are all singlets.

In the first example (of FIG. 4), we make the limiting depression ray of $-40°$ and the elevation ray of $50°$, giving a total deviation $90°$ such that $\theta_1=30°$, $\theta_3=30°$, $\theta_5=10°$, $\theta_7=10°$ and send the ray into the imagery part. In order to make the first and third lens surfaces aspheric $e$ is calculated after determining $\beta$ from the Formula 7, so that the first became an ellipsoid and the third a hyperboloid. The virtual image is now formed near by the vertex, and making the following surfaces aspheric, therefore, of little effect. Hence, we make them all spherical except the last. Against the deviation part made as above, we put the imagery part which has a suitably positive amount of spherical aberration (I). Knowing the last image curvature by comparing the result of tracing the limiting depression ray with that of the pseudo-zenith ray treated as standard, we gave the aspheric correction to the last surface, which became thereby a hyperboloid. Although the brightness is about F:4.5 along the axis, it becomes darker for use, because the vertex parts are bored and stopped and only oblique rays are used, which is unavoidable. Besides, in the figures, AA' and BB' represent the paths of rays and the image surface in general. Thus, we have a wide panoramic optical system for the limiting depression ray of $-40°$.

The second example (of FIG. 5) is made as the standard panoramic system for the limiting depression ray of $-30°$ realized only by spherical surfaces. The image curvature is eliminated by the considerable thicknesses of the last imagery part before it, thereby the brightness is decreased as compared with the first example of FIG. 4 and is about F:5.6 for the zenith direction. A′₆B′₆ represents the virtual image surface after passing through the deviation part, where a solid and a dotted line denote respectively the sagital and meridional image. This is a state of negative astigmatism, which is eliminated, of course, by the imagery part. Either of these two samples is the system of the ringed image type.

The third or fourth example (of FIG. 6 or FIG. 7) is the system of the zonal image type and is made for the standard panorama only using spheres. In the third example (of FIG. 6) the real image which is to be given to the second deviation part, according to the principle of image curvature, must have stronger curvature than the virtual image after passing through the first deviation part. For this purpose, an asymmetry is given such that the elevation of the limiting depression ray before and after passing through the imagery part is respectively 50° and about 40°, i.e., the ray after passing receives an opening angle as to the axis, which is very effective. Since more opening leads to flattening the last surface of the imagery part and to weakening the imagery power, this grade of 40° seems suitable. Hence, the second deviation part receives diminishing of the deviation by 10°, and also becomes asymmetric with (reference to) the first. Now, putting a cylindrical film on the image position of the lens system for photographing, we can adjust the focus as follows:

For separating the cemented surfaces of the imagery part and making a space bring increase of the imagery power but little change of the aberration, the adjusting can be done by opening and closing of the space, which corresponds to the rotation method of the front lens in an ordinary lens system. Thus, the front lens action exists inside. This can be said also in the first and second examples (of FIGS. 4 and 5), and we can project the photographed positive on a cylindrical screen in such a manner as a magic lantern, which is the reverse of photographing.

The fourth example (of FIG. 7) is the standard panoramic system in which a catadioptric system is used in the deviation part. Every negatively denoted quantity of refractive index $n$ or thickness $d'$ in the data, in accordance with the previously stated "new sign convention," tells us the existence of the reflecting surface, without any explanation. In this case, the image surface after passing through the first deviation part is almost flat. This is also to be seen by the total of the Petzval quantity IV. Since, for a kind of glass of refractive index $n$, the indexes are $-1, -n, n, 1$ in order, from the first surface to the third, then the total $$(IV) = -\frac{1}{r_1}\left(\frac{1}{-n} - \frac{1}{-1}\right) - \frac{1}{r_2}\left(\frac{1}{n} - \frac{1}{-n}\right) - \frac{1}{r_3}\left(\frac{1}{1} - \frac{1}{w}\right)$$

$$= -\frac{n-1}{n}\left(\frac{1}{r_1} + \frac{1}{r_2}\right) - \frac{2}{nr_2},$$

since $r_1 < 0$, $r_2 < 0$, $r_3 > 0$ and the third curvature is large, then the first term of the above becomes negative and the second positive, and, consequently, the terms tend to be eliminated. The sign conventions control even the catadioptric system exactly and mechanically, only by using the refraction formulas.

Receiving the flat virtual image, the imagery part unilaterally bends the image to the stop side and undoubtedly gives it the asymmetry. Therefore, not only the method of opening angle 40° as in the third example is of no use, but also even that of closing angle or of the increasing elevation is used, which have been already explained in the discussion of the limiting elevation ray. It appears that the imagery part may be symmetrical as to the stop, but we make the part asymmetrical, considering the aberrational relation. The elevation accepted by the imagery part becomes about 70°, the brightness F:5.6 along the axis, and the limiting elevation ray as far as 30°, which we deviated 20° by the first surface and 13° by the third, so that we could restrain the second angle of reflection about 68° with difficulty. Although the depression ray of the angle as far as −60° can be accepted, the cylindrical image surface becomes high and the magnification of axial direction great. Adjusting the focus can be done by the front lens action of the imagery part as in the third example. Since the reflecting surfaces are not always totally reflecting, they must be plated.

In order to make the system of the ringed image type by using such a catadioptric deviation system (of FIG. 7), we may put such an imagery part as on the first and second examples (of FIGS. 4 and 5), omitting details. In this case, the inner part of the image corresponds to the elevation ray and the outer to the depression ray, which is the reverse to the refracting system and moreover, the image turns inside out. As the narrow system of this case, there exists the well-known Aldis' "panoramic periscope." But, the first surface of the deviation system faced to the horizon is a sphere whose center lies on the horizontal line, and the third surface which the ray after reflecting penetrates is a sphere whose center is a center of the imagery part, then the horizontal chief-ray accepts no deviation from the first and third surfaces. Hence, as the natural results, both the elevation and depression rays are narrow and less than 10°, and the deviation system itself is under using-state considered to be of no aberration, so that the imagery part may be any ordinary lens which have no aberration, independent of the deviation part, which means no using of the principle of the distribution of aberrations and so on of this present invention. Besides, a "fish-eye" lens aims at the hemispherical field, which is different from the present invention.

Thus, by the fundamental analysis of geometrical optics, all the problems as to the optical system can be solved which can catch the standard panorama at least, by using concepts of the deviation system, the imagery system and the limiting depression ray etc., and the principles of chromatic aberration and image curvature etc. Then we can also make the afocal attachment which catches any panorama and gives the ringed image.

It will be apparent to those skilled in the art that my invention is susceptible of modifications to adapt the same to meet particularly conditions, and all such modifications which are within the appended claims are considered to be comprehended with the scope of this invention.

I claim:

1. A panoramic system consisting of axially symmetrically arranged elements geometrically determined as follows where $r$ is the radius of curvature, $d'$ is the thickness, $n$ is the refractive index, $v$ is the Abbé number, and $e$ is the eccentricity and $Z_{11}'$ is the real stop: and $g1$ to $g15$ are lens surfaces and lens ($g9$, $g10$, $g11$) and lens ($g12$, $g13$, $g14$) are doublets, and the other lenses are singlets.

| No. | $r$ | $d'$ | $n$ | $v$ | $e$ |
|---|---|---|---|---|---|
| $g1$ | 1.210 | −0.056 | 1 | | [1] 0.698 |
| $g2$ | 0.761 | 0.653 | 1.5163 | 64 | |
| $g3$ | 1.060 | 0 | 1 | | [2] 1.222 |
| $g4$ | 0.489 | 0.169 | 1.4875 | 70 | |
| $g5$ | 0.675 | 0.023 | 1 | | |
| $g6$ | 0.283 | 0.166 | 1.4875 | 70 | |
| $g7$ | 0.495 | 0.023 | 1 | | |
| $g8$ | 0.396 | 0.183 | 1.4875 | 70 | |
| $g9$ | 0.231 | 0.058 | 1 | | |
| $g10$ | 0.1117 | 0.061 | 1.7174 | 29.6 | |
| $g11$ | 0.488 | 0.029 | 1.6260 | 39.2 | $z_{11}'=0.022$ |
| $g12$ | 1.194 | 0.058 | 1 | | |
| $g13$ | −0.1463 | 0.161 | 1.6260 | 39.2 | |
| $g14$ | −0.334 | | 1.812 | 1.7174 | [2] 1.812 |
| $g15$ | | | 1 | | |

[1] Ellipoid of revolution.
[2] Hyperboloid of revolution.

2. A panoramic system consisting of axially symmetrically arranged elements geometrically determined as follows, where $r$ is the radius of curvature, $d'$ is the thickness, and $n$ is the refractive index, omitting the Abbé number $v$ and $Z_9'$ is the real stop and $h1$ to $h15$ are lens surfaces, and lens ($h7$, $h8$, $h9$) and lens ($h10$, $h11$, $h12$) are doublets, and the other lenses are singlets:

| No. | $r$ | $d'$ | $n$ |
|---|---|---|---|
| $h1$ | 1.730 | 0 | 1 |
| $h2$ | 0.685 | 0.578 | 1.5163 |
| $h3$ | 1.716 | 0 | 1 |
| $h4$ | 0.473 | 0.164 | 1.4875 |
| $h5$ | 0.745 | 0.021 | 1 |
| $h6$ | 0.282 | 0.342 | 1.4875 |
| $h7$ | 0.232 | 0.058 | 1 |
| $h8$ | 0.1117 | 0.061 | 1.7174 |
| $h9$ | 0.488 | 0.029 | 1.6260    $z_9'=0.022$ |
| $h10$ | 1.194 | 0.058 | 1 |
| $h11$ | −0.1463 | 0.161 | 1.6260 |
| $h12$ | −0.410 | 0.228 | 1.7174 |
| $h13$ | −0.307 | 0.250 | 1 |
| $h14$ | −0.629 | | 1.4875 |
| $h15$ | | | 1 |

3. A panoramic system consisting of axially symmetrically arranged elements geometrically determined as follows, where $r$ is the radius of curvature, $d'$ is the thickness, $n$ is the refractive index, omitting the Abbé number $v$ and $Z_9'$ is the real stop and $t1$ to $t19$ are lens surfaces, and lens ($t7$, $t8$, $t9$) and lens ($t10$, $t11$, $t12$) are doublets, and the other lenses are singlets:

| No. | $r$ | $d'$ | $n$ |
|---|---|---|---|
| $t1$ | 1.624 | 0 | 1 |
| $t2$ | 0.643 | 0.537 | 1.5163 |
| $t3$ | 1.623 | 0 | 1 |
| $t4$ | 0.445 | 0.224 | 1.4875 |
| $t5$ | 2.532 | 0.019 | 1 |
| $t6$ | 0.437 | 0.290 | 1.4875 |
| $t7$ | 0.232 | 0.058 | 1 |
| $t8$ | 0.1117 | 0.061 | 1.7174 |
| $t9$ | 0.488 | 0.029 | 1.6260    $z_9'=0.022$ |
| $t10$ | 1.194 | 0.380 | 1 |
| $t11$ | −0.200 | 0.032 | 1.6260 |
| $t12$ | −0.455 | 0.220 | 1.7174 |
| $t13$ | −0.272 | 0.014 | 1 |
| $t14$ | 0.489 | 0.098 | 1.4875 |
| $t15$ | −0.311 | 0 | 1 |
| $t16$ | −1.130 | 0.375 | 1.4875 |
| $t17$ | −0.450 | 0 | 1 |
| $t18$ | −1.140 | | 1.4875 |
| $t19$ | | | 1 |

4. A panoramic system consisting of axially symmetrically arranged lens elements geometrically determined as follows, where $r$ is the radius of curvature, $d'$ is the thickness, $n$ is the refractive index, omitting the Abbé number $v$ and $Z_8'$ is the real stop and $u1$ to $u13$ are lens surfaces, and lens ($u4$, $u5$, $u6$) and lens ($u7$, $u8$, $u9$) are doublets, an the other lenses are singlets, and $u2$ and $u11$ are polished reflecting surfaces, and $u1$, $u3$, $u10$, $u12$ are refracting surfaces:

| No. | $r$ | $d'$ | $n$ |
|---|---|---|---|
| $u1$ | −0.485 | −0.198 | −1 |
| $u2$ | −0.858 | 0 | −1.5163 |
| $u3$ | 0.225 | 0.403 | 1.5163 |
| $u4$ | 0.1693 | 0.042 | 1 |
| $u5$ | 0.0817 | 0.044 | 1.7174 |
| $u6$ | 0.356 | 0.023 | 1.6260   $z_8'=0.017$ |
| $u7$ | 1.168 | 0.057 | 1 |
| $u8$ | −0.128 | 0.183 | 1.6260 |
| $u9$ | −0.401 | 0.400 | 1.7174 |
| $u10$ | −0.225 | 0 | 1 |
| $u11$ | 0.858 | −0.198 | 1.5163 |
| $u12$ | 0.485 | | −1.5163 |
| $u13$ | | | −1 |

References Cited by the Examiner

UNITED STATES PATENTS 1,616,279  1/27  Parodi _____ 88—57 X
2,734,423  2/56  Bertele _____ 88—57
2,734,424  2/56  Bertele _____ 88—57

FOREIGN PATENTS 1,183,489  1/59  France.
1,200,781  7/59  France.
620,538  10/35  Germany.

JEWELL H. PEDERSEN, *Primary Examiner.*

EMIL G. ANDERSON, *Examiner.*